J. BLACKIE.
Coffee Pot.
No. 64,476.
Patented May 7, 1867.
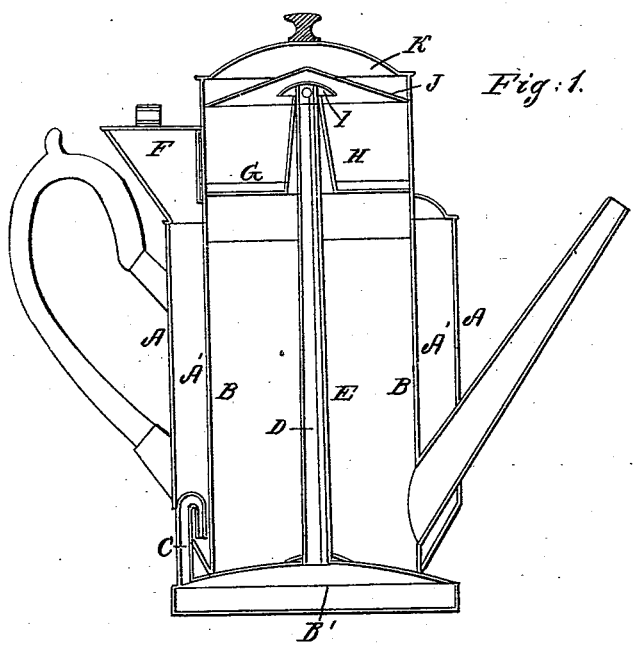
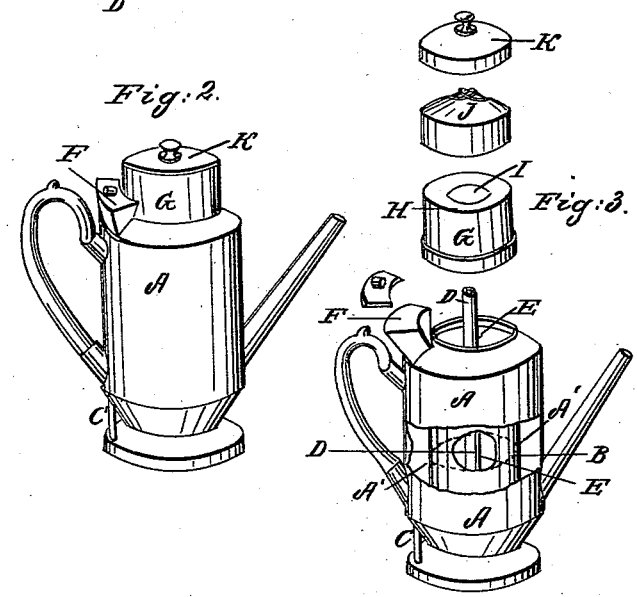
Witnesses:
Chas. H. Poole.
Philip C. Dieterich.
Inventor:
John Blackie
By his Atty:
R. D. O. Smith.

United States Patent Office.

JOHN BLACKIE, OF NEW YORK, N. Y.

Letters Patent No. 64,476, dated May 7, 1867.

COFFEE-POT.

*The Schedule referred to in these Letters Patent and making part of the same.*

TO ALL WHOM IT MAY CONCERN:

Be it known that I, JOHN BLACKIE, of New York, in the county of New York, and State of New York, have invented a new and useful improvement in Coffee-Pots; and I do hereby declare the following to be a full, clear, and exact description of the same, reference being had to the accompanying drawings, in which—

Figure 1 is a vertical longitudinal section of my coffee-pot.
Figure 2 is a perspective view of the same.
Figure 3 represents the same with separate parts detached.

My invention consists in forming a coffee-pot with two shells or one vessel within another and three compartments, and an arrangement of ducts or communicating passages by which, when the water has been placed in the outer compartment and its temperature raised to the boiling point the pressure of the generated steam will force the boiling liquid up and into a leaching vessel at the top of the inner vessel, and into which the ground coffee is placed, and through which the boiling water passes into the inner vessel, thence to be drawn as required for use.

That others may understand the construction and operation of this invention, I will fully describe it.

The case A forms the outer part of the vessel and is in form like any other implement of the kind. Within the case A is an inner shell, B, which forms the coffee receptacle, from which the same is to be drawn by means of an ordinary spout or faucet. The shell B is joined to the shell A at the top and also at the bottom of the shell B, which is concave, and at a little distance above the bottom of the shell A. This divides the outer case into two compartments, A' and B', which are joined by the siphon C, and from the centre of the compartment B' the pipe D rises through the centre of the inner compartment E, a little distance above the upper edge of the shell B. The funnel F at the top compartment A' gives access to the said compartment. The leaching vessel G is fitted to the top of the shell B and closes the top of the compartment E. The bottom of the leaching vessel is made of perforated metal and is provided with a tapering tube, H, which encases and closely fits the upper end of the tube D. A cap, I, covers the upper end of the tube H, and the deep-flanged cover J fits within the sides of the leaching vessel and makes a steam-tight cover. An outside cover, K, may be added, if desired, and a cover may be fitted to the funnel F, if necessary. These are the features of my coffee-pot. The details of construction may of course be varied, but the same results can only be attained by an observance of the principles herein set forth.

The operation of this invention will now be described, but first I will mention the advantages gained and the principles of its operation. In making the beverage known as coffee it is necessary to extract both the volatile principle and the essence, the one containing the aroma or flavor and the other the body or strength, and so extract them that they will be mingled and preserved in the beverage. If the solution be boiled the aroma passes off with the steam, and the remaining fluid is strong and often bitter. If sufficient heat is not applied the volatile property alone is extracted, and the product is not satisfactory on account of its weakness. The most satisfactory process hitherto resorted to has been that of leaching, but, as commonly practised, the boiling water is passed too quickly through the ground coffee, and when, after leaching, the beverage is not required for use immediately, it is liable to be heated to the boiling point and the aroma finally driven off. In my coffee-pot the water is thrown upon the ground coffee in the leaching vessel in minute quantities, so that there is sufficient time to extract both aroma and strength, and as no steam arises from the mass of leaching coffee the aroma cannot escape. It is carried down into the receptacle E, and when finally no more boiling water comes over the coffee and the process is finished, the contents of the said receptacle cannot be raised to the boiling point, because it will be protected at the bottom by the remaining contents of the chamber B' and at the sides by the space A'. The boiling water passes but once through the mass of the ground coffee, and the strength is completely extracted thereby. When water, either cold or hot, is poured into the outer chamber A' through the funnel F, it passes through the siphon C into the chamber B' and rises in the pipe D. The coffee is placed in the leaching vessel G, and, the covers being put in place, the whole is set over the fire. When the water in the chamber B' begins to boil the generated steam forces the water within the tube D upward in intermittent jets against the cap I, by which it is scattered in every direction over the coffee. At each intermission of pressure fresh water descends from the chamber A' through the tube C, until the chamber A' has been entirely emptied and the whole or nearly the whole of the water originally poured through the funnel F has been forced upward through the pipe D and has descended into the inner chamber E. This action corresponds in appearance with the phenomena of the Geysers of Iceland, and my coffee-pot may therefore not inappropriately be called the Geyser coffee-pot.

It is evident that so far as the method of extracting the essence of the coffee is concerned the details of construction may be greatly varied, as, for instance, the compartment A′ may be placed at the side of instead of surrounding the compartment E without changing the action of the apparatus in any respect; and the outer cylinder A may be straight from top to bottom, instead of being indented, as shown; such changes being entirely arbitrary and immaterial.

Having described my invention, what I claim as new, and desire to secure by Letters Patent, is—

1. A coffee-pot, constructed with the three compartments A′, B′, and E, and the tubes C and D, or their equivalents, in combination, to produce the effects set forth and described.

2. A coffee-pot constructed with an inner and an outer receptacle communicating with each other, so that the water shall be heated in the outer and then pass into the inner, and so that the vessel containing the solution of coffee shall be surrounded by an air or water-space, and the said solution thereby prevented from being heated to the boiling point, substantially as set forth.

3. The leaching vessel G and tube H, provided with the cap I, in combination with the tube D and chambers B′ and E, substantially as and for the purpose set forth.

4. The siphon C, in combination with the compartments A′ and B′ and the tube D, substantially as and for the purpose set forth.

JOHN BLACKIE.

Witnesses:
R. D. O. SMITH,
PHILIP C. DIETERICK.